US011284250B2

(12) United States Patent
Ohlsson et al.

(10) Patent No.: US 11,284,250 B2
(45) Date of Patent: Mar. 22, 2022

(54) NETWORK, NETWORK NODES, WIRELESS COMMUNICATION DEVICES AND METHOD THEREIN FOR HANDLING NETWORK SLICES IN A WIRELESS COMMUNICATION NETWORK

(71) Applicant: telefonaktiebolaget LM Ericsson (publ), Stockholm (SE)

(72) Inventors: Oscar Ohlsson, Stockholm (SE); Peter Hedman, Helsingborg (SE); Prajwol Kumar Nakarmi, Sollentuna (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 557 days.

(21) Appl. No.: 16/301,967

(22) PCT Filed: Jun. 4, 2018

(86) PCT No.: PCT/SE2018/050576
§ 371 (c)(1),
(2) Date: Nov. 15, 2018

(87) PCT Pub. No.: WO2018/231125
PCT Pub. Date: Dec. 20, 2018

(65) Prior Publication Data
US 2021/0195509 A1    Jun. 24, 2021

Related U.S. Application Data

(60) Provisional application No. 62/520,661, filed on Jun. 16, 2017.

(51) Int. Cl.
*H04W 4/00* (2018.01)
*H04K 1/00* (2006.01)
(Continued)

(52) U.S. Cl.
CPC ......... *H04W 12/037* (2021.01); *H04W 12/02* (2013.01); *H04W 48/18* (2013.01); *H04W 60/00* (2013.01)

(58) Field of Classification Search
CPC .... H04W 48/18; H04W 12/037; H04W 60/00
(Continued)

(56) References Cited

U.S. PATENT DOCUMENTS

2016/0094988 A1* 3/2016 Lee .................. H04W 12/0433
380/270
2018/0227743 A1* 8/2018 Faccin .................. H04W 76/10
(Continued)

FOREIGN PATENT DOCUMENTS

WO    2016 048574 A1    3/2016
WO    2017 200978 A1    11/2017

OTHER PUBLICATIONS

3GPP TR 33.899 v1.1.0; Tschnical Report; 3rd Generation Partnership Project; Technical Specification Group Services and System Aspects; Study on the security aspects of the next generation system (Release 14)—Mar. 2017.
(Continued)

*Primary Examiner* — Mark G. Pannell
(74) *Attorney, Agent, or Firm* — Sage Patent Group (57) ABSTRACT

A communication device, network node and methods therein in for handling network slices in a wireless communication network are disclosed. The communication device encrypts Network Slice Selection Assistance information, NSSAI, using public key cryptography and includes the encrypted NSSAI in a Non Access Stratum, NAS, registration request. Then the communication device sends a Radio Resource Control, RRC, request to the network node including the NAS registration request. The network node receives the RRC connection request from the communication device
(Continued)

and selects a network function based on information in the RRC connection request. The network node forwards the NAS registration request to the network function and forwards to the communication device a NAS registration response received from the network function after the network function decrypting the NSSAI using a PLMN private key.

26 Claims, 9 Drawing Sheets (51) Int. Cl.
*H04W 12/037* (2021.01)
*H04W 12/02* (2009.01)
*H04W 48/18* (2009.01)
*H04W 60/00* (2009.01)

(58) Field of Classification Search
USPC .......................................................... 370/329
See application file for complete search history.

(56) References Cited

U.S. PATENT DOCUMENTS

| | | | |
|---|---|---|---|
| 2018/0270666 A1* | 9/2018 | Lee | H04W 12/069 |
| 2018/0359795 A1* | 12/2018 | Baek | H04W 48/18 |
| 2019/0182875 A1* | 6/2019 | Talebi Fard | H04W 24/02 |
| 2019/0261178 A1* | 8/2019 | Rajadurai | H04W 12/03 |

OTHER PUBLICATIONS

Introduction of the Asymmetric Cryptography in GSM, GPRS, UMTS, and Its Public Key Infrastructure Integration by Constantinos F. Grecas et al.; Mobile Networks and Applications 8, 145-150; Kluwer Academic Publishers, Manufactured in The Netherlands—2003.
3GPP TSG-RAN WG3 Meeting #93bis; Sophia Antíopolís, France; Source: Huawei; Title: Solution for Selection of Network Slice and CN entity (R3-162460)—Oct. 10-14, 2016.
PCT International Search Report for international application No. PCT/SE2018/050576—dated Aug. 13, 2018.
PCT Written Opinion of the International Searching Authority for International application No. PCT/SE2018/050576—dated Aug. 13, 2018.

\* cited by examiner

FIG. 9

NETWORK, NETWORK NODES, WIRELESS COMMUNICATION DEVICES AND METHOD THEREIN FOR HANDLING NETWORK SLICES IN A WIRELESS COMMUNICATION NETWORK

TECHNICAL FIELD

Embodiments herein relate to a network, a network node, a wireless communication device and methods therein. In particular, they relate to handle network slices during network registration for a wireless communication device in a wireless communication network.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a "NodeB" or "eNodeB" or "gNB". A service area or cell area is a geographical area where radio coverage is provided by the radio network node. The radio network node communicates over an air interface operating on radio frequencies with the wireless device within a range of the radio network node.

A Universal Mobile Telecommunications System (UMTS) is a third generation (3G) telecommunication network, which evolved from the second generation (2G) Global System for Mobile Communications (GSM). Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network.

Network slicing is a new concept in 5G network to allow differentiated treatment depending on each customer requirements. Network slices may differ in supported features and network functions optimizations. The operator may also deploy multiple network slice instances delivering exactly the same features but for different groups of UEs, e.g. as they deliver a different committed service and/or because they may be dedicated to a customer.

A single UE can simultaneously be served by one or more network slices. A single UE may be served by at most 8 network slices at a time. The Access and Mobility Management Function (AMF) instance serving the UE logically belongs to each of the network slices serving the UE, i.e. this AMF instance is common to the network slices serving a UE.

The Network Slice Selection Assistance information (NSSAI) is a new identifier in the 5G system which is included at network registration in both Radio Resource Control (RRC) and Non Access Stratum (NAS) to allow the network to select the correct network slice(s). The NSSAI represents the network slices serving the UE and consists of one or more Single NSSAI (S-NSSAIs). Each S-NSSAI identifies a single network slice and is in turn comprised of two parts:

Slice/Service type (SST) which identifies a type of slice e.g., enhanced Mobile BroadBand (eMBB) addressing human-centric use cases for access to multimedia content, services and data, or Ultra-reliable-low latency communications (URLLC) with strict requirements, especially in terms of latency and reliability.

Slice Differentiator (SD) which distinguishes network slices of the same type e.g., two eMBB slices.

The NSSAI included at RRC level enables the RAN to select a suitable AMF, i.e. an AMF that supports the network slice(s) that the UE subscribes to. The NSSAI is provided both in the initial network registration i.e. "Attach" and in network registration triggered due to mobility when the UE enters a new registration area i.e. Tracking Area Update (TAU). The reason for providing NSSAI also in the latter case is because the new registration area may be served by a different AMF pool which requires a new AMF to be selected. The NSSAI is included in MSG5 of the RRC connection establishment which also carries the NAS registration request message. Once an AMF has been selected the CN uses the NSSAI provided at NAS level to select the CN part of the network slice.

If the RAN is unable to select an AMF based on the NSSAI or if no NSSAI is included, the request is routed to a default AMF. The default AMF can then choose to re-direct the UE to some more suitable AMF based on subscription information and information provided at NAS level. Thus the NSSAI included at RRC level can be regarded as an optimization to avoid unnecessary AMF re-directions.

For subsequent accesses where the UE remains within the same registration area e.g. service request and has already been assigned an AMF, no assistance information may need to be included in the RRC connection establishment. In this case the temporary UE Identity (Temp ID) assigned to the UE by the AMF during network registration is sufficient for the RAN to locate the serving AMF. Temp ID is equivalent to System Architecture Evolution (SAE)-Temporary Mobile Subscriber Identity (S-TMSI) in Evolved Packet Core (EPC) and is included in MSG3 of the RRC connection establishment.

In some scenarios, the network slices a UE subscribes to are considered sensitive information e.g. access to public safety related slice(s), and network slice IDs should therefore preferably not be revealed. This is a problem in the current network slice selection procedure since the NSSAI is sent both in the NAS and RRC layers which are open over the air interface.

SUMMARY

Therefore it is an object of embodiments herein to provide an improved technique for handling network slices for a wireless communication device in a wireless communication network.

According to one aspect of embodiments herein, the object is achieved by a method performed in a wireless communication device for handling network slices in a wireless communication network. The wireless communication device encrypts Network Slice Selection Assistance information, NSSAI, using public key cryptography. Then includes the encrypted NSSAI in a Non Access Stratum, NAS, registration request. The wireless communication device further sends a Radio Resource Control, RRC, connection request to a network node including the NAS registration request.

According to one aspect of embodiments herein, the object is achieved by a wireless communication device for handling network slices in a wireless communication network. The wireless communication device is configured to encrypt Network Slice Selection Assistance information, NSSAI, using public key cryptography and include the encrypted NSSAI in a Non Access Stratum, NAS, registration request. The wireless communication device is further configured to send a Radio Resource Control, RRC, connection request to a network node including the NAS registration request.

According to one aspect of embodiments herein, the object is achieved by a method performed in a network node for handling network slices for a communication device in a wireless communication network. The wireless communication network comprises the network node in a Radio Access Network, RAN, and a network function in a core network, CN, of the wireless communication network. The network node receives a Radio Resource Control, RRC, connection request from the wireless communication device and the RRC connection request comprises a NAS registration request including a Network Slice Selection Assistance information, NSSAI, encrypted using Public Land Mobile Network, PLMN, public key. The network node selects a network function based on information in the RRC connection request and forward the NAS registration request to the network function. The network node further forwards to the wireless communication device a NAS registration response received from the network function after the network function decrypting the NSSAI using a PLMN private key.

According to one aspect of embodiments herein, the object is achieved by a network node for handling network slices for a communication device in a wireless communication network. The wireless communication network comprises the network node in a Radio Access Network, RAN, and a network function in a core network, CN, of the wireless communication network. The network node is configured to receive a Radio Resource Control, RRC, connection request from the wireless communication device and the RRC connection request comprises a NAS registration request including a Network Slice Selection Assistance information, NSSAI, encrypted using Public Land Mobile Network, PLMN, public key. The network node is further configured to select a network function based on information in the RRC connection request and forward the NAS registration request to the network function. The network node is further configured to forward to the wireless communication device a NAS registration response received from the network function after the network function decrypting the NSSAI using a PLMN private key.

According to one aspect of embodiments herein, the object is achieved by a method performed in a wireless communication network for handling network slices for a communication device. The wireless communication network comprises a network node and a network function. The network node is in a Radio Access Network, RAN, and the network function is in a core network, CN, of the wireless communication network. The network node receives a Radio Resource Control, RRC, connection request from the communication device and the RRC connection request comprises a NAS registration request including a Network Slice Selection Assistance information, NSSAI, encrypted using Public Land Mobile Network, PLMN, public key. The network node selects a network function based on information provided in the RRC connection request. The network nod forwards to the network function the NAS registration request. The network function decrypts the encrypted NSSAI using a PLMN private key. The network node receives from the network function a NAS registration response. The network node sends to the communication device the NAS registration response.

According embodiments herein, to avoid revealing information about the network slices the UE subscribes to at network registration, the NSSAI included in NAS is encrypted using public key cryptography, e.g. the Home Public Land Mobile Network's (HPLMN's) or Registered PLMN's (RPLMN) public key.

The NSSAI included in RRC may be replaced with a new identifier, e.g. an AMF selection ID, which is only used for AMF routing.

The NSSAI included at NAS level is encrypted at least for the initial network registration when no NAS context is available and NAS security has not yet been activated. At subsequent, e.g. mobility triggered, network registrations no additional encryption is required as NAS security will be activated at this point.

The AMF selection ID may be sent in clear text in RRC, but since it does not identify the individual network slices, less information is revealed than if NSSAI is included. An additional benefit of the AMF selection ID is that it may be shorter than NSSAI which reduces the size of the RRC message.

Alternatively, the NSSAI in NAS may be encrypted using the HPLMN or RPLMN's public key, in the same way as above, and the NSSAI in RRC may be encrypted using a RAN public key. This requires though that the RAN public key can be securely distributed to the UE, e.g. by being signed with a root key and broadcasted in system information or provided over NAS protected using NAS security.

In a further alternative, the NSSAI in NAS may be encrypted using the HPLMN or RPLMN's public key, in the same way as above, and no identifier is included in RRC. As no information is included in RRC, the RAN selects a default AMF which then potentially re-directs the UE based on the encrypted NSSAI provided in NAS.

In yet another alternative, the NSSAI in NAS and in RRC may both be encrypted using the HPLMN or RPLMN's public key. This requires that the HPLMN or RPLMN's public key is provided by the AMF(s) to the RAN in a secure manner, e.g. by using IP Security (IPsec) during the establishment of the RAN/CN or New core network to N2 (NG-C/N2) interface. In a roaming scenario, in case the HPLMN's public key is used, the UE needs additionally to provide in RRC the HPLMN identity to assist the RAN in selection of the right public key to decrypt the NSSAI. For the non-roaming case and in shared RAN scenario, the RAN selects the public key based on UE's indication of the selected PLMN.

The embodiments herein improve user privacy in network slicing by avoiding revealing information about which network slices the UE subscribes to at network registration. This is done by either encrypting the network slice identifier using public key cryptography, replacing the identifier with a less specific identifier revealing less information, or omitting the identifier and relying on re-direction, or a combination of these mechanisms.

BRIEF DESCRIPTION OF THE DRAWINGS

Examples of embodiments herein are described in more detail with reference to attached drawings in which.

DETAILED DESCRIPTION

Please note that the terms "UE" "user equipment" and wireless communication device are used interchangeably in this document.

Figure 1:
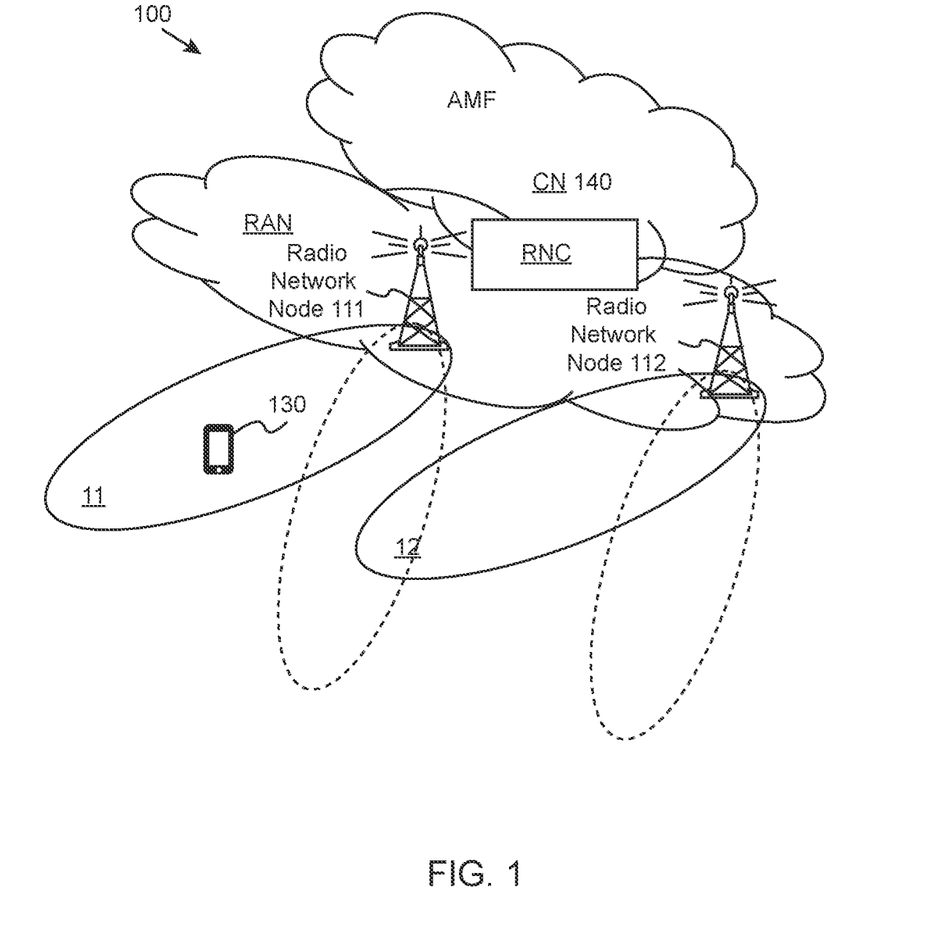
FIG. 1 is a schematic block diagram depicting embodiments of a wireless communication network.

Embodiments herein relate to a wireless communication networks in general. FIG. 1 is a schematic overview depicting a wireless communication network 100. The wireless communication network 100 may be a wireless communications network comprising one or more RANs and one or more CNs. The wireless communication network 100 may use a number of different technologies, such as Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 100, wireless communication devices e.g. a user equipment 130 such as a mobile station, a non-access point (non-AP) STA, a STA, or a wireless terminal, communicates via one or more Access Networks (AN), e.g. RAN, to one or more core networks (CN). It should be understood by the skilled in the art that "wireless communication device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell. The terms user equipment 130, UE, UE 130 and wireless communication device 130 are used interchangeable herein.

Network nodes operate in the wireless communication network 100 such as a first network node 111 and a second network node 112. The first network node 111 provides radio coverage over a geographical area, a service area 11, which may also be referred to as a beam or a beam group where the group of beams is covering the service area of a first radio access technology (RAT), such as 5G, LTE, Wi-Fi or similar. The second network node 112 provides radio coverage over a geographical area, a service area 12, which may also be referred to as a beam or a beam group where the group of beams is covering the service area of a first radio access technology (RAT), such as 5G, LTE, Wi-Fi or similar.

The first and second network nodes 111 and 112 may be a transmission and reception point e.g. a radio access network node such as a Wireless Local Area Network (WLAN) access point or an Access Point Station (AP STA), an access controller, a base station, e.g. a radio base station such as a NodeB, a gNB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the service area served by the respective first and second network nodes 111 and 112 depending e.g. on the first radio access technology and terminology used. The first and second network nodes 111 and 112 may be referred to as a serving radio network node and communicates with the wireless device 130 with Downlink (DL) transmissions to the wireless device 130 and Uplink (UL) transmissions from the wireless device 130.

The wireless communication network 100 further comprises a CN 140 where one or more network functions, e.g. an AMF, are included.

Example Embodiments will be described in the following.

Embodiment 1: NSSAI in NAS encrypted using PLMN public key, NSSAI in RRC replaced with new identifier.

Figure 2:
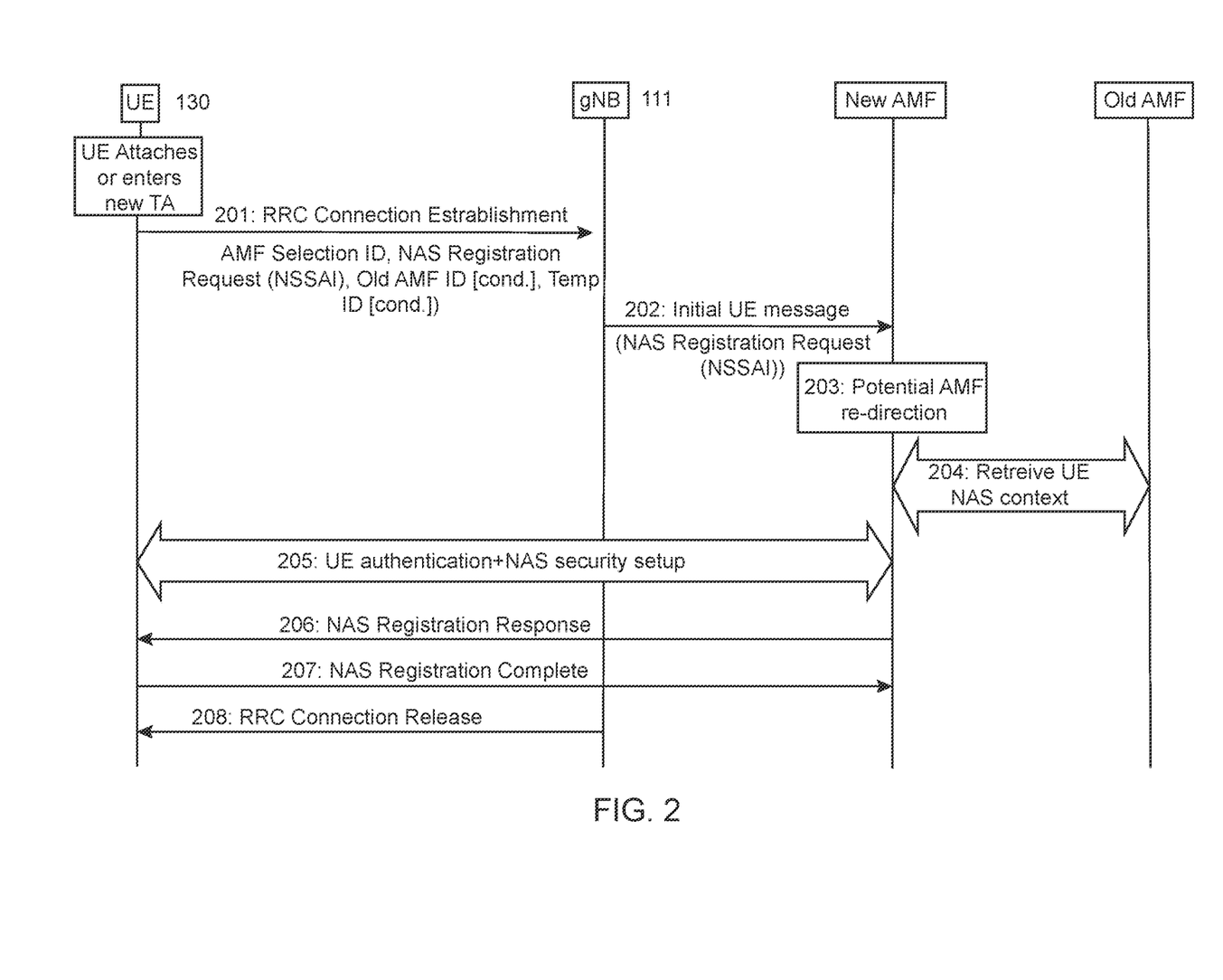
FIG. 2 is a signaling diagram illustrating a first embodiment of handling network slices in a wireless communication network.

FIG. 2 illustrates a signal flow chart of this embodiment in the wireless communication network 100.

In this embodiment, the NSSAI included in NAS is encrypted with the HPLMN or RPLMN's public key and the NSSAI included in RRC is replaced with a new identifier which is only used for AMF routing.

The HPLMN or RPLMN's public key used to encrypt the NSSAI included in NAS is assumed to be pre-configured by the HPLMN. Alternatively, the HPLMN or RPLMN's public key can be delivered to the UE 130 via e.g. system information broadcast. In this case some form of PKI is needed to securely distribute the public key. If the HPLMN public key used for encryption and the UE 130 is roaming, i.e. HPLMN≠RPLMN, the RPLMN may need assistance from the HPLMN to decrypt the NSSAI unless it has access to the HPLMN private key.

The AMF selection ID included in RRC level can either be pre-configured in the UE or configured over NAS in the initial registration. In the latter case no AMF selection ID is included in the initial registration which means the RAN selects a default AMF.

The message flow for the network registration is shown in FIG. 2 and described as following steps:

Step 201: The UE 130 establishes the RRC connection establishment and includes the AMF selection ID and the NAS registration request. The NAS registration request in turn includes the NSSAI which the UE has encrypted using the HPLMN or RPLMN's public key. In case the network registration is triggered due to mobility, i.e. UE entering a new registration area, the UE will also provide the identity of the old AMF and its Temp ID in order for the new AMF to be able to retrieve the UE NAS context from the old AMF. This is similar to Tracking Area Update in LTE where the UE provides GUMMEI and S-TMSI to allow the UE context to be retrieved from the old MME.

Step 202: The RAN routes the NAS registration to an AMF based on the AMF selection ID. If no AMF selection ID is provided the RAN selects a default AMF.

Step 203: The AMF decrypts the NSSAI in the NAS registration request using the HPLMN or RPLMN's private key and selects the CN part of the network slice(s). If the AMF does not support the network slices indicated in the NSSAI the UE is re-directed to another AMF.

Step 204: In case the UE 130 is already registered to the network, the AMF retrieves the UE NAS context from the old AMF based on the Old AMF ID and Temp ID.

Step 205: For the initial network registration, the AMF identifies the UE and establishes NAS security.

Step 206: Provided the UE 130 is allowed to register to the network, the AMF replies with a NAS registration setup.

Step 207: The acknowledges the NAS registration setup by sending the NAS registration setup complete.

Step 208: The RRC connection is released by the RAN.

Note that the NSSAI included at NAS level only needs to be encrypted using the public key in the initial registration when no NAS context exists and NAS security has not yet been activated. At subsequent registrations, NAS security is activated and the NAS layer encryption ensures the confidentiality of the NSSAI.

Embodiment 2: NSSAI in NAS encrypted using PLMN public key and NSSAI in RRC encrypted using RAN public key.

Figure 3:
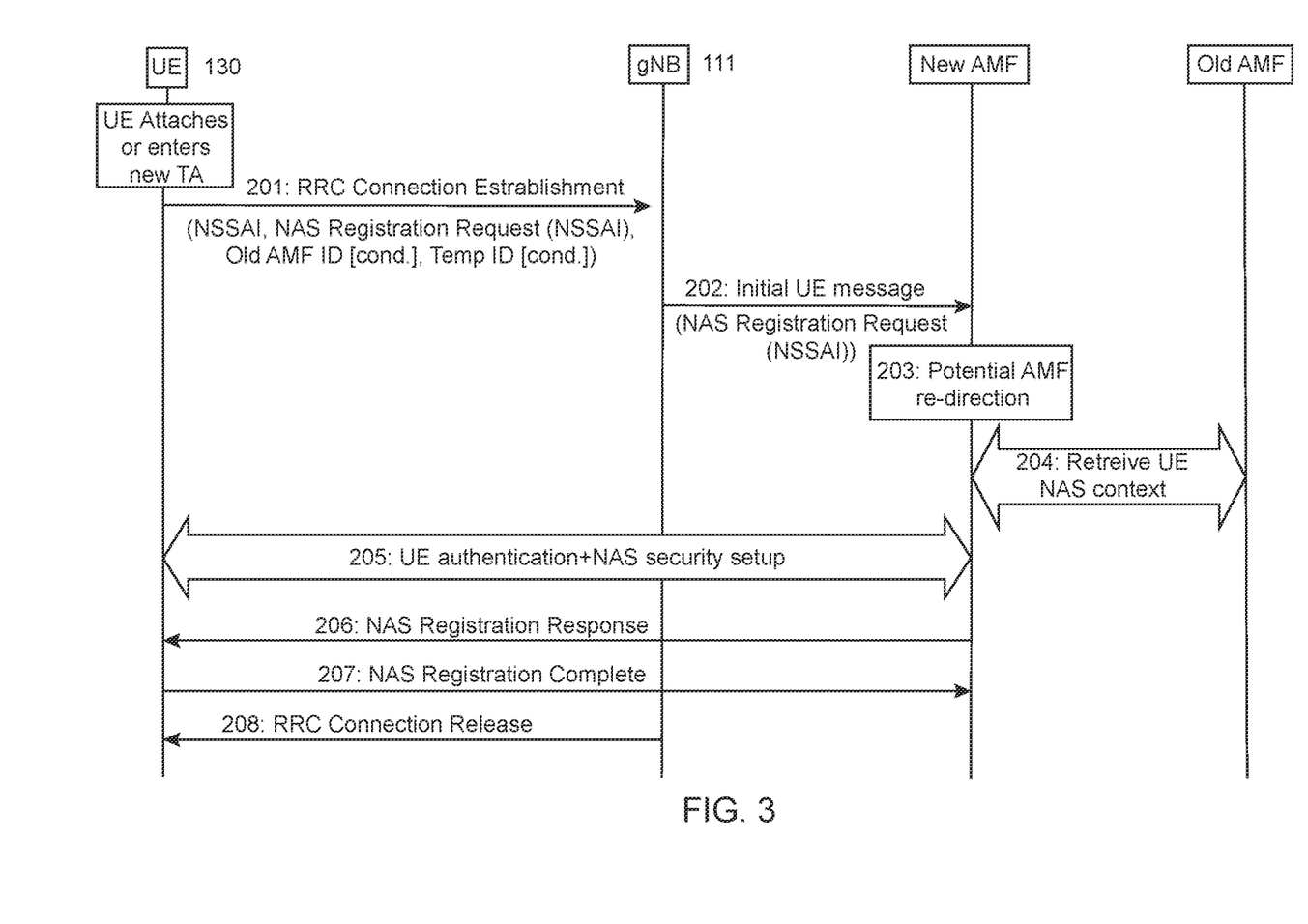
FIG. 3 is a signaling diagram illustrating a second embodiment of handling network slices in a wireless communication network.

In this embodiment, the NSSAI is included in both RRC and NAS at network registration. The NSSAI in NAS is encrypted using the HPLMN or RPLMN public key, in the same way as the previous embodiment, and the NSSAI in RRC is encrypted using a RAN public key.

The message flow for the network registration is the same as in the first embodiment except that the NSSAI encrypted with the RAN public key is included in the first step 201 instead of the AMF selection ID. This is shown in FIG. 3. The gNB 111 decrypts the NSSAI using the RAN private key and uses it to route the NAS registration request to a suitable AMF.

The RAN public key can either be specific for each gNB or common for all gNBs in the RAN. In general, using individual keys is more secure as it provides security compartmentalization, i.e. the compromise of one gNB does not impact other gNBs.

The RAN public key can either be delivered in the broadcasted system information or configured over NAS in the initial registration. In the latter case no NSSAI is included in RRC in the initial registration which means the RAN selects a default AMF.

As a potential optimization, the NSSAI in NAS can be omitted and instead the RAN can forward the NSSAI included in RRC to the AMF. This approach requires though that the NSSAI is always provided in RRC, including the initial network registration.

Embodiment 3: NSSAI in NAS encrypted using PLMN public key, no NSSAI in RRC.

Figure 4:
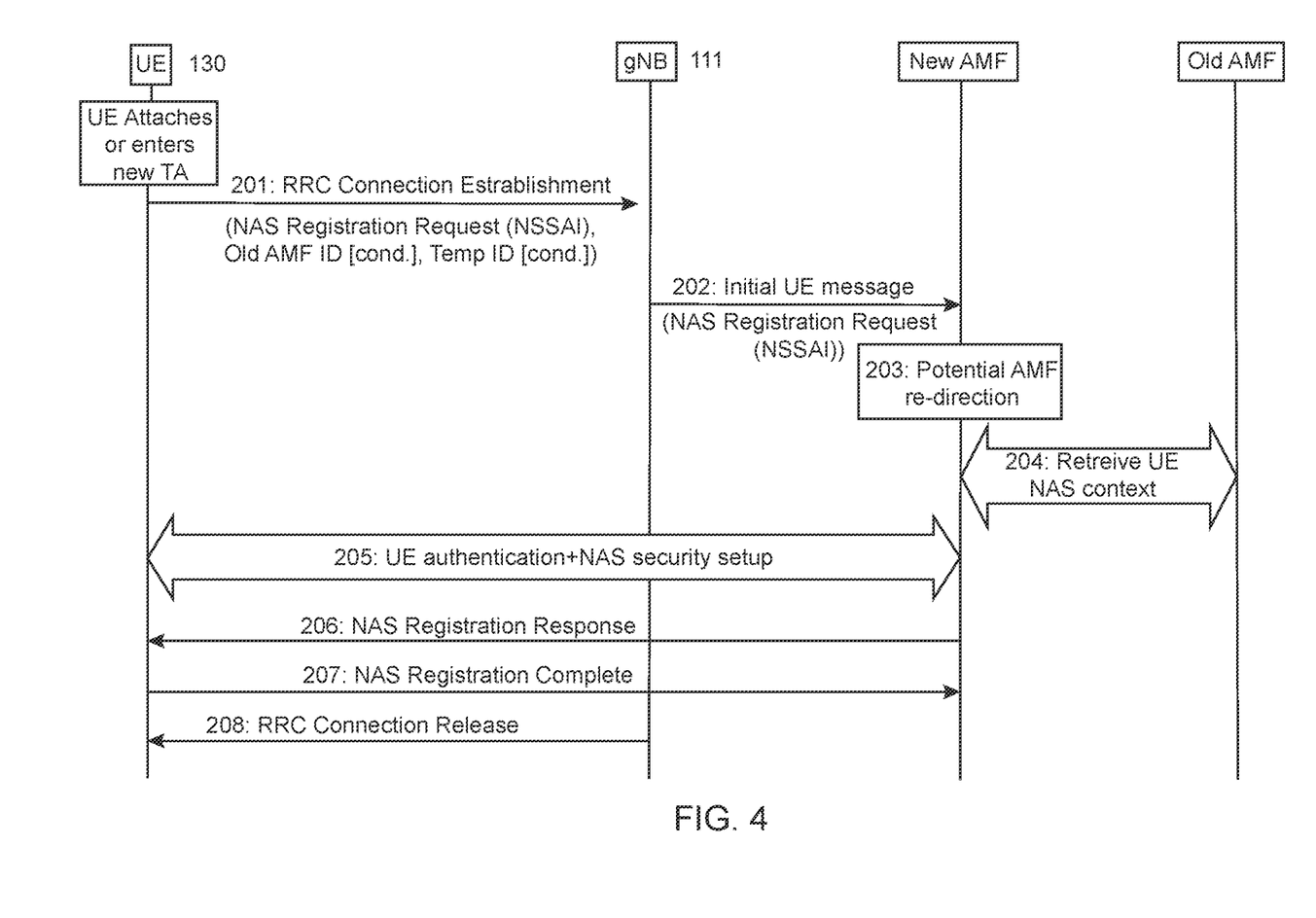
FIG. 4 is a signaling diagram illustrating a third embodiment of handling network slices in a wireless communication network.

In this embodiment the NSSAI is included only in NAS at network registration and no information is included in the RRC level.

The message flow for the network registration is the same as in the first embodiment except that the AMF selection ID is omitted in the first step 201. This is shown in FIG. 4. As no routing information is included in RRC, the AMF always selects a default AMF. The default AMF then potentially re-directs the UE 130 based on the encrypted NSSAI provided in NAS.

Compared to the previous embodiment, this embodiment is simpler but potentially results in more AMF re-directions which increases latency and the amount of RAN/CN signaling.

Embodiment 4: NSSAI in NAS and RRC both encrypted using PLMN public key.

Figure 5:
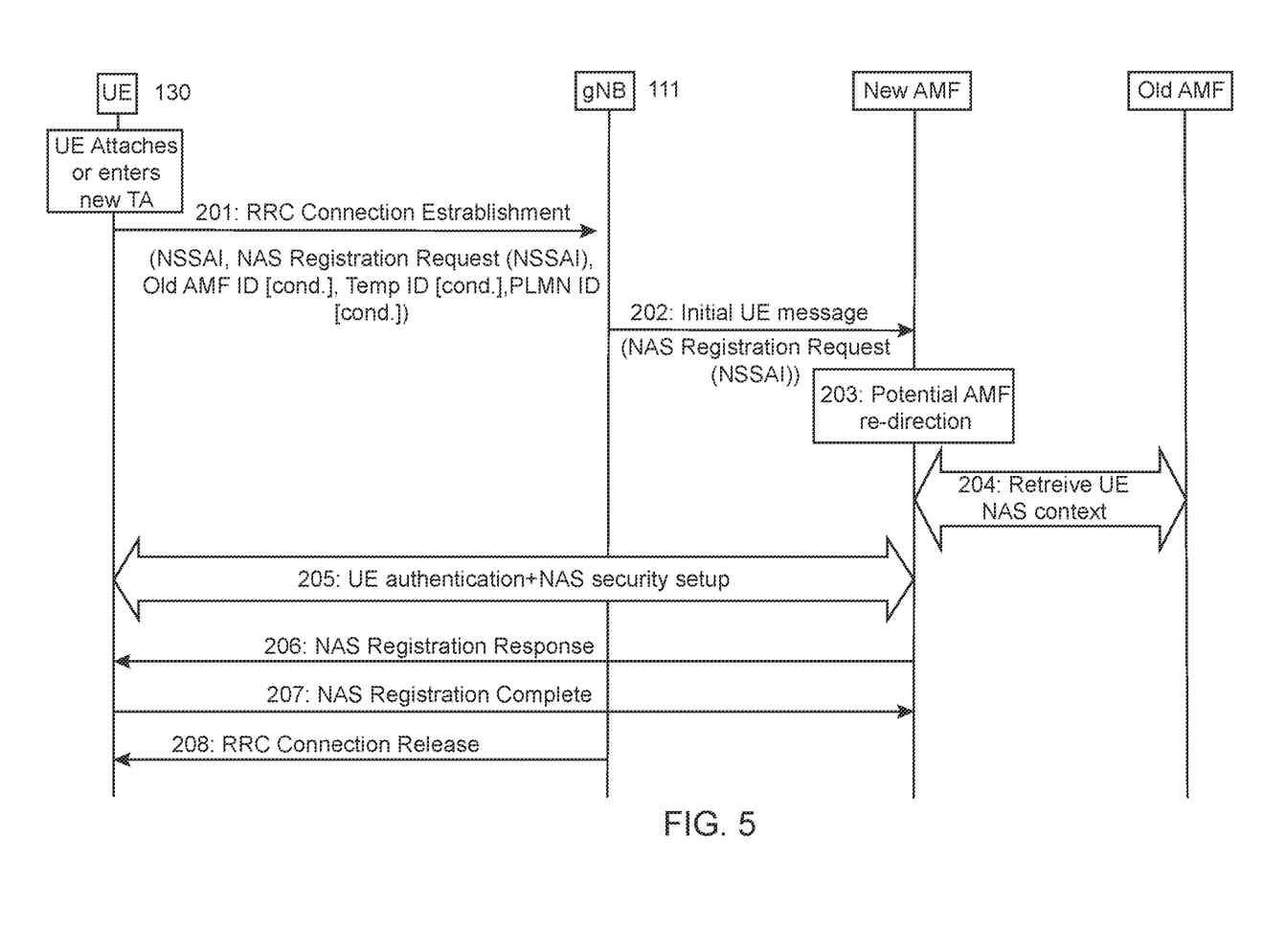
FIG. 5 is a signaling diagram illustrating a fourth embodiment of handling network slices in a wireless communication network.

In this embodiment, the NSSAI is included in both RRC and NAS at network registration. The NSSAI in NAS and RRC are both encrypted using the HPLMN or RPLMN public key.

The message flow for the network registration is the same as in the first embodiment except that the NSSAI encrypted with the HPLMN or RPLMN public key is included in the first step 201 instead of the AMF selection ID. This is shown in FIG. 5. The gNB 111 decrypts the NSSAI using the HPLMN or RPLMN private key and uses it to route the NAS registration request to a suitable AMF.

In a roaming scenario, in case the HPLMN's public key is used, the UE needs additionally to provide in RRC, the HPLMN identity to assist the RAN in selection of the right public key to decrypt the NSSAI. For the non-roaming case and in shared RAN scenario, the RAN selects the public key based on UE's indication of the selected PLMN.

Embodiments herein improve user privacy in network slicing by avoiding revealing information about which network slices the UE subscribes to during network registration. This is done by either encrypting the network slice identifier using public key cryptography, replacing the identifier with a less specific identifier revealing less information, omitting the identifier and relying on re-direction, or a combination of these mechanisms as described above.

Figure 6:
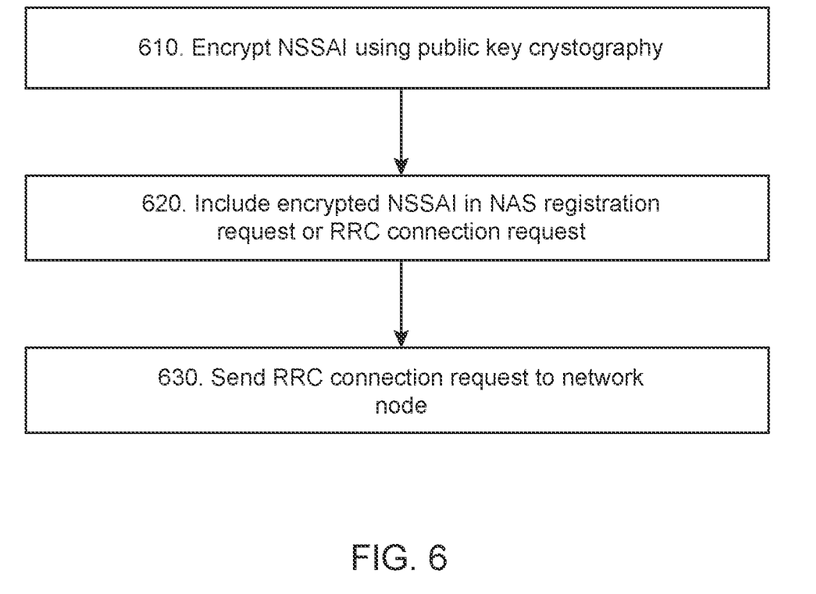
FIG. 6 is flowchart illustrating a method performed in a wireless communication device according to embodiments herein.

According to these embodiments, a method performed in the communication device 130 for handling network slices in the wireless communication network (100) is now described with reference to FIG. 6. The method comprises the following actions, which may be performed in any suitable order.

Action 610

The communication device 130 encrypts Network Slice Selection Assistance information, NSSAI, using public key cryptography. The encryption may be performed using Public Land Mobile Network, PLMN, public key.

According some embodiments herein, the communication device 130 may encrypt Network Slice Selection Assistance information, NSSAI, using Radio Access Network, RAN, public key. The RAN public key may be specific for each network node or common for all network nodes in the RAN.

Action 620

The communication device 130 includes the encrypted NSSAI in a Non Access Stratum, NAS, registration request.

According some embodiments herein, the communication device 130 may include the encrypted NSSAI in the RRC connection request.

According some embodiments herein, the communication device 130 may include an AMF selection identifier in the RRC connection request. The AMF selection identifier may be pre-configured in the communication device 130 or configured over a NAS in an initial registration.

Action 630

The communication device 130 sends a Radio Resource Control, RRC, connection request to a network node including the NAS registration request.

Figure 7:
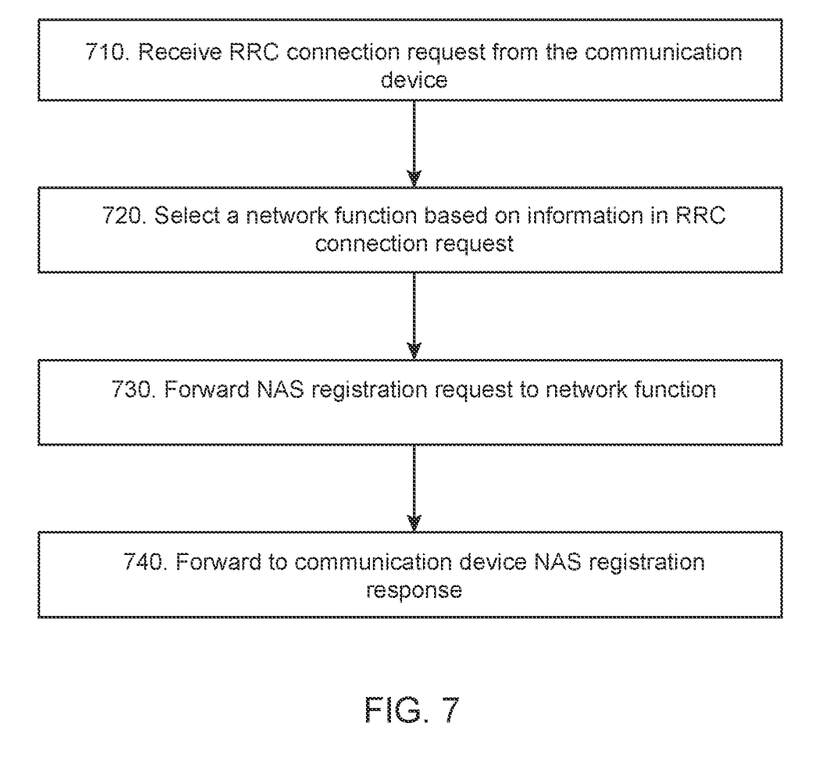
FIG. 7 is flowchart illustrating a method performed in a network node according to embodiments herein.

According to the embodiments herein, a method performed in a network node 111 for handling network slices for a communication device 130 in a wireless communication network 100 will be described with reference to FIG. 7. The wireless communication network 100 comprises the network node in a Radio Access Network, RAN, and a network function, e.g. AMF, in a CN. The method comprises following actions, which may be performed in any suitable order.

Action 710

The network node 111 receives a RRC connection request from the communication device 130. The RRC connection request comprises a NAS registration request including a NSSAI encrypted using PLMN public key.

Action 720

The network node 111 selects a network function based on information in the RRC connection request.

According to some embodiments, the network function is selected based on a AMF selection identifier provided in the RRC connection request.

According to some embodiments, the network function is selected based on a RAN public key encrypted NSSAI provided in the RRC connection request.

According to some embodiments, the network function is selected based on a PLMN public key encrypted NSSAI provided in the RRC connection request.

According to some embodiments, the network function is selected based on a default AMF if no AMF selection identifier is included in the RRC connection request.

Action 730

The network node 111 forwards the NAS registration request to the network function.

Action 740

The network node 111 forwards to the communication device 130 a NAS registration response received from the network function after the network function decrypting the NSSAI using a PLMN private key.

Figure 8:
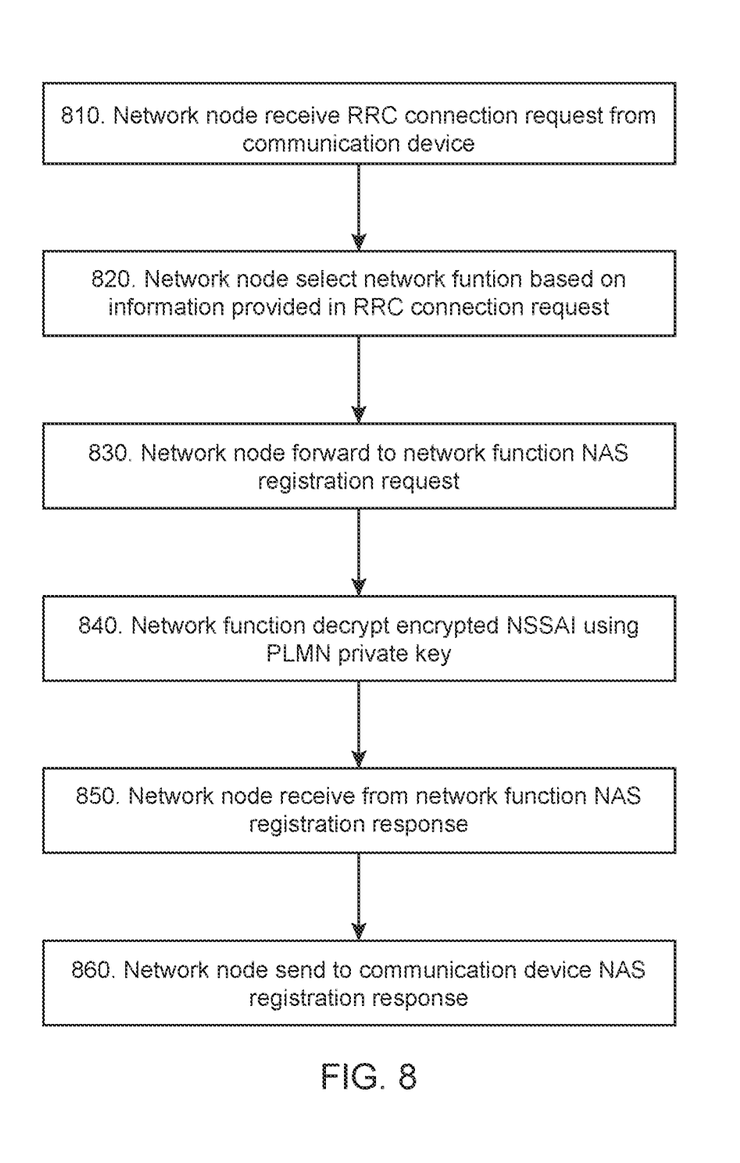
FIG. 8 is flowchart illustrating a method performed in a wireless communication network according to embodiments herein.

According to the embodiments herein, a method performed in a wireless communication network 100 for handling network slices for a communication device 130 is now described with reference to FIG. 8. The wireless communication network 100 comprises a network node in a RAN and a network function in a CN of the wireless communication network 100. The method comprises following actions, which may be performed in any suitable order.

Action 810

The network node 111 receives a RRC connection request from the communication device 130. The RRC connection request comprises a NAS registration request including a NSSAI encrypted using PLMN public key.

Action 820

The network node 111 selects a network function based on information provided in the RRC connection request.

Action 830

The network node forwards to the network function the NAS registration request.

Action 840

The network function decrypts the encrypted NSSAI using a PLMN private key.

Action 850

The network node 111 receives from the network function a NAS registration response.

Action 860

The network node 111 sends to the communication device 130 the NAS registration response.

Figure 9:
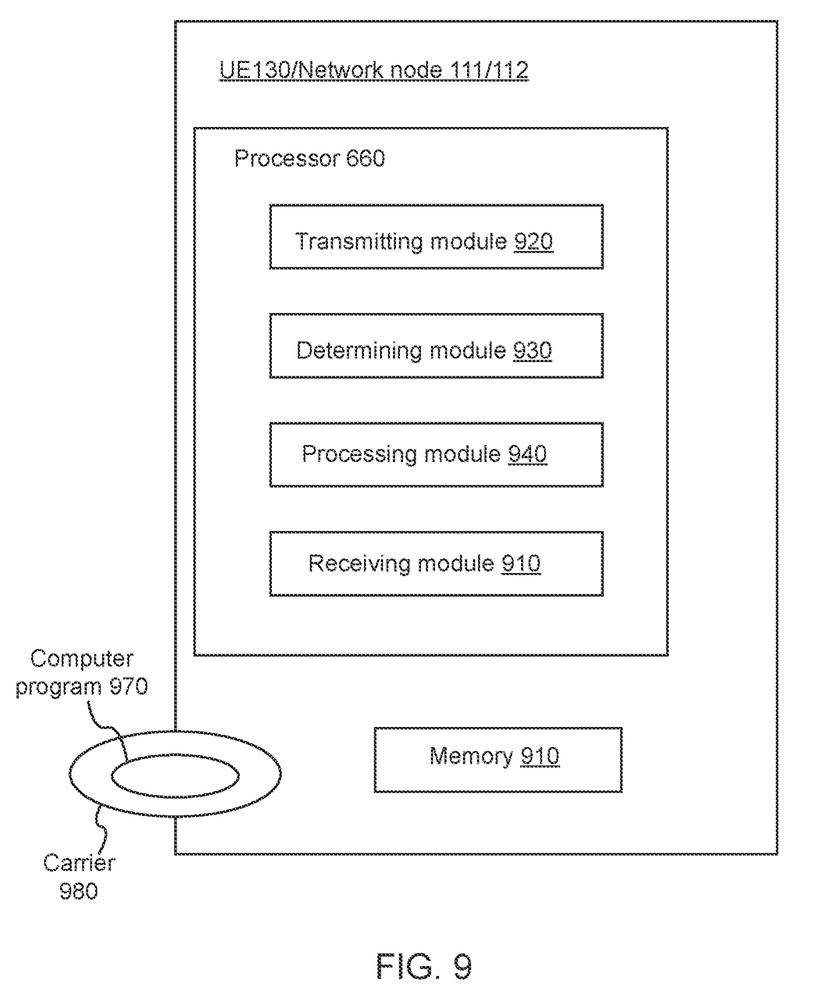
FIG. 9 is a schematic block diagram illustrating one embodiment of an UE, a network node or a second network node.

To perform the method in the UE 130 or in the network node 111/112, the UE 130 or the network node 111/112 comprises modules as shown in FIG. 9. The UE/network node 130/111/112 comprises a receiving module 910, a transmitting module 920, a determining module 930, a processing module 940, a memory 950 etc.

The communication device 130 is configured to, by means of e.g. the determining module 930 being configured to, encrypt NSSAI using public key cryptography. The encryption may be performed using Public Land Mobile Network, PLMN, public key.

According some embodiments herein, the communication device 130 may be configured to encrypt NSSAI using RAN public key. The RAN public key may be specific for each network node or common for all network nodes in the RAN.

The communication device 130 may be further configured to include the encrypted NSSAI in a NAS registration request.

According some embodiments herein, the communication device 130 may be further configured to include the encrypted NSSAI in the RRC connection request.

According some embodiments herein, the communication device 130 may be further configured to include an AMF selection identifier in the RRC connection request. The AMF selection identifier may be pre-configured in the communication device 130 or configured over a NAS in an initial registration.

The communication device 130 is further configured to, by means of e.g. transmitting model 920 being configured to, send a RRC connection request to a network node including the NAS registration request.

The network node 111 is configured to, by means of e.g. receiving model 910 being configured to, receive a RRC connection request from the communication device 130. The RRC connection request comprises a NAS registration request including a NSSAI encrypted using PLMN public key.

The network node 111 is configured to, by means of e.g. the determining module 930 being configured to, select a network function based on information in the RRC connection request.

According to some embodiments, the network function is selected based on a AMF selection identifier provided in the RRC connection request.

According to some embodiments, the network function is selected based on a RAN public key encrypted NSSAI provided in the RRC connection request.

According to some embodiments, the network function is selected based on a PLMN public key encrypted NSSAI provided in the RRC connection request.

According to some embodiments, the network function is selected based on a default AMF if no AMF selection identifier is included in the RRC connection request.

The network node 111 is further configured to, by means of e.g. transmitting module 920 being configured to, forward the NAS registration request to the network function.

The network node 111 is further configured to, by means of e.g. transmitting module 920 being configured to, forward to the communication device 130 a NAS registration response received from the network function after the network function decrypting the NSSAI using a PLMN private key.

Those skilled in the art will appreciate that the receiving unit 910, the determining unit 930 and the transmitting unit 920 described above in the UE/network node 130/111/112 may be referred to one circuit/unit, a combination of analog and digital circuits, one or more processors configured with software and/or firmware and/or any other digital hardware performing the function of each circuit/unit. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC).

The embodiments herein for handling network slices in the wireless communication network 100 performed in the wireless communication device/network node 130/111/112 may be implemented through one or more processors, such as the processing unit 940 together with computer program code for performing the functions and actions of the embodiments herein. The program code mentioned above may also be provided as a computer program product, for instance in the form of a data carrier 980 carrying computer program code 970 for performing the embodiments herein when being loaded into the communication device/network node. One such carrier may be in the form of a CD ROM disc. It is however feasible with other data carriers such as a memory stick. The computer program code 970 may furthermore be provided as pure program code on the cloud and downloaded to the communication device/network node 130/111/112.

The memory 950 in communication device/network node 130/111/112 may comprise one or more memory units and may be arranged to be used to store information, look up tables, historic lists, data, configurations and applications to perform the methods herein when being executed in communication device/network node 130/111/112.

As used herein, the term "processing module" may refer to a processing circuit, a processing unit, a processor, an Application Specific integrated Circuit (ASIC), a Field-Programmable Gate Array (FPGA) or the like. As an example, a processor, an ASIC, an FPGA or the like may comprise one or more processor kernels. In some examples, the processing module may be embodied by a software module or hardware module. Any such module may be a determining means, estimating means, capturing means, associating means, comparing means, identification means, selecting means, receiving means, transmitting means or the like as disclosed herein. As an example, the expression "means" may be a module, such as a determining module, selecting module, etc.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), etc.

As used herein, the term "computer readable code units" may be text of a computer program, parts of or an entire binary file representing a computer program in a compiled format or anything there between.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

The invention claimed is:

1. A method performed in a communication device for handling network slices in a wireless communication network, the method comprising:

encrypting Network Slice Selection Assistance information, NSSAI, using public key cryptography that includes a Radio Access Network, RAN, public key to provide encrypted NSSAI;

including the encrypted NSSAI in a Non Access Stratum, NAS, registration request; and sending a Radio Resource Control, RRC, connection request to a network node including the NAS registration request and including an Access and Mobility Management Function, AMF, selection identifier.

2. The method according to claim 1, wherein the encryption is performed using Public Land Mobile Network, PLMN, public key.

3. The method according to claim 1, further comprising: including the encrypted NSSAI in the RRC connection request.

4. The method according to claim 1, further comprising: including the encrypted NSSAI in the RRC connection request.

5. The method according to claim 4, wherein the RAN public key is specific for each network node or common for all network nodes in the RAN.

6. The method according to claim 1, wherein the AMF selection identifier is pre-configured in the communication device or configured over a NAS in an initial registration.

7. A communication device for handling network slices in a wireless communication network, the communication device comprising circuitry configured to:

encrypt Network Slice Selection Assistance information, NSSAI, using public key cryptography that includes a Radio Access Network, RAN, public key to provide encrypted NSSAI;

include the encrypted NSSAI in a Non Access Stratum, NAS, registration request; and send a Radio Resource Control, RRC, connection request to a network node including the NAS registration request and including an Access and Mobility Management Function, AMF, selection identifier.

8. The communication device according to claim 7, wherein the encryption is performed using Public Land Mobile Network, PLMN, public key.

9. The communication device according to claim 7 is further configured to include the encrypted NSSAI in the RRC connection request.

10. The communication device according to claim 7, wherein the circuitry is further configured to:

include the encrypted NSSAI in the RRC connection request.

11. The communication device according to claim 10, wherein the RAN public key is specific for each network node or common for all network nodes in the RAN.

12. The communication device according to claim 7, wherein the circuitry is further configured to include an AMF selection identifier in the RRC connection request.

13. The communication device according to claim 12, wherein the AMF selection identifier is pre-configured in the communication device or configured over a NAS in an initial registration.

14. A method performed in a network node for handling network slices for a communication device in a wireless communication network, wherein the wireless communication network comprises the network node in a Radio Access Network, RAN, and a network function in a core network, CN, the method comprising:

receiving a Radio Resource Control, RRC, connection request from the communication device; wherein the RRC connection request comprises a NAS registration request including a Network Slice Selection Assistance information, NSSAI, encrypted using Public Land Mobile Network, PLMN, public key;

selecting a network function based on information in the RRC connection request,
  wherein selecting the network function is based on a Access and Mobility Management Function, AMF, selection identifier provided in the RRC connection request;

forwarding the NAS registration request to the network function;

forwarding to the communication device a NAS registration response received from the network function after the network function decrypting the NSSAI using a PLMN private key.

15. The method according to claim 14, wherein selecting a network function is based on a Radio Access Network, RAN, public key encrypted NSSAI provided in the RRC connection request.

16. The method according to claim 14, wherein selecting a network function is based on a default AMF if no AMF selection identifier is included in the RRC connection request.

17. The method according to claim 14, wherein selecting a network function is based on a PLMN public key encrypted NSSAI provided in the RRC connection request.

18. A network node for handling network slices for a communication device in a wireless communication network, wherein the wireless communication network comprises the network node in a Radio Access Network, RAN, and a network function in a core network, CN, the network node is configured to:

receive a Radio Resource Control, RRC, connection request from the communication device; wherein the RRC connection request comprises a NAS registration request including a Network Slice Selection Assistance information, NSSAI, encrypted using Public Land Mobile Network, PLMN, public key;

select a network function based on information in the RRC connection request, and based on a Access and Mobility Management Function, AMF, selection identifier provided in the RRC connection request;

forward the NAS registration request to the network function;

forward to the communication device a NAS registration response received from the network function after the network function decrypting the NSSAI using a PLMN private key.

19. The network node according to claim 18, wherein the information in the RRC connection request is a Mobility Management Function, AMF, selection identifier.

20. The network node according to claim 18, wherein the information in the RRC connection request is a Radio Access Network, RAN, public key encrypted NSSAI.

21. The network node according to claim 18, wherein a network function is selected based on a default AMF if no AMF selection identifier is included in the RRC connection request.

22. The network node according to claim 18, wherein the information in the RRC connection request is a PLMN public key encrypted NSSAI.

23. A method performed in a wireless communication network for handling network slices for a communication device, wherein the wireless communication network comprises a network node in a Radio Access Network, RAN, and a network function in a core network, CN, of the wireless communication network, the method comprising:

receiving in the network node a Radio Resource Control, RRC, connection request from the communication device; wherein the RRC connection request comprises a NAS registration request including a Network Slice Selection Assistance information, NSSAI, encrypted using Public Land Mobile Network, PLMN, public key;

selecting a network function in the network node based on information provided in the RRC connection request,
  wherein selecting the network function is based on a Access and Mobility Management Function, AMF, selection identifier provided in the RRC connection request;

forwarding from the network node to the network function the NAS registration request;

decrypting in the network function the encrypted NSSAI using a PLMN private key;

receiving in the network node from the network function a NAS registration response;

sending from the network node to the communication device the NAS registration response.

24. The method according to claim 23, wherein selecting a network function is based on a Radio Access Network, RAN, public key encrypted NSSAI provided in the RRC connection request.

25. The method according to claim 23, wherein selecting a network function is based on a default AMF if no AMF selection identifier is included in the RRC connection request.

26. The method according to claim 23, wherein selecting a network function is based on a PLMN public key encrypted NSSAI provided in the RRC connection request.

* * * * *